No. 658,218. Patented Sept. 18, 1900.
W. F. McALLISTER.
STRIPPING MACHINE ATTACHMENT.
(Application filed Jan. 5, 1900.)
(No Model.)
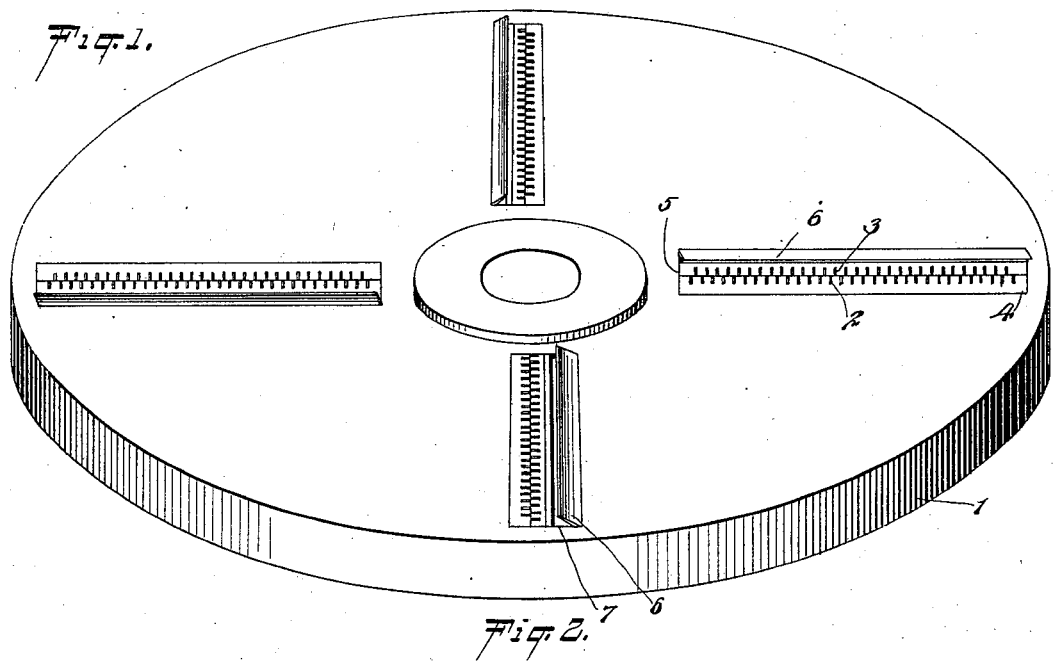
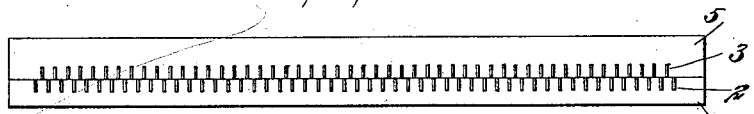
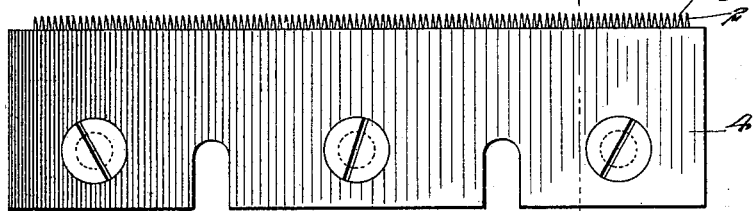
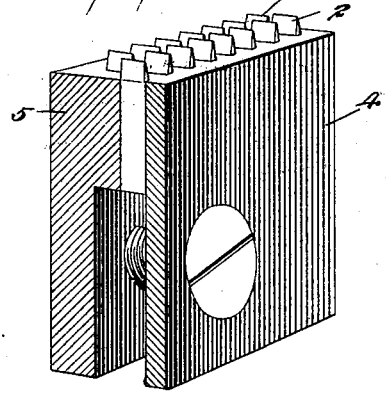
WITNESSES:
INVENTOR
W. F. McAllister
BY
ATTORNEYS

UNITED STATES PATENT OFFICE.

WILLIAM F. McALLISTER, OF MERCHANTVILLE, NEW JERSEY.

STRIPPING-MACHINE ATTACHMENT.

SPECIFICATION forming part of Letters Patent No. 658,218, dated September 18, 1900.

Application filed January 5, 1900. Serial No. 487. (No model.)

*To all whom it may concern:*

Be it known that I, WILLIAM F. MCALLISTER, a citizen of the United States, and a resident of Merchantville, in the county of Camden and State of New Jersey, have invented a new and Improved Stripping-Machine Attachment, of which the following is a full, clear, and exact description.

This invention relates to improvements in stripping attachments, particularly for machines used in the manufacture of desiccated cocoanut; and the object is to provide a stripping attachment with teeth so arranged that very fine and long threads of material may be stripped without choking the machine and from which broken stripping-teeth may be easily and quickly removed and replaced by new ones or for sharpening.

I will describe a stripping-machine attachment embodying my invention, and then point out the novel features in the appended claims.

Reference is to be had to the accompanying drawings, forming a part of this specification, in which similar characters of reference indicate corresponding parts in all the views.

Figure 1 is a perspective view of a stripping machine attachment embodying my invention. Fig. 2 is a top view of a stripping-tooth holder or casing employed. Fig. 3 is a side view thereof, and Fig. 4 is a perspective sectional view on the line 4 4 in Fig. 3.

Referring to the drawings, 1 designates a disk of metal or other suitable material, said disk being designed to rotate in a suitable casing, which it is not deemed necessary to show herein, neither is it deemed necessary to show a means for rotating the disk. Carried by the disk are several series of stripping-teeth and planing-knives. Each series of teeth consists of two rows 2 3, the row 2 being removably supported in a section 4 of a holder or casing, and the row 3 being removably held in a section 5 of said holder or casing. The holder or casing sections are provided with recesses at their adjacent sides to receive the stripping-teeth, and when the several teeth are assembled the holder or casing sections are to be suitably clamped together, as here shown, by screws, and then the device is to be secured in an opening formed in the disk 1, as plainly indicated in Fig. 1. It will be seen that the teeth of the two rows forming a series are staggered, or, in other words, the teeth of one row are placed directly opposite the space between two adjacent teeth of the opposite row. By this arrangement the holder or casing provides for supporting twenty teeth to the inch—that is, ten teeth to the inch in each row; but the same principle can be used in a casing arranged for a greater number of teeth to the inch, such as eighteen, twenty-two, twenty-four, twenty-six, and so on. Another advantage of this arrangement of teeth is that they will cut finer and longer threads than is possible with the ordinary machines, in which the teeth are arranged in single rows, and, further, the teeth being very fine and delicate are susceptible to breakage; but it is obvious that should a tooth be broken it can be readily removed and replaced by a new one at a comparatively-small cost, while with the old styles of machines having a single row of comb-teeth a breakage is a large item of expense. Furthermore, in a single-row machine it is found almost impossible to remove a tooth for sharpening or other purposes on account of want of space between the teeth, whereas in this instance the space for this purpose is just doubled. There is another advantage in that it has been found by actual experience that the old style of single-row teeth will not do good work when placed much nearer together than sixteen to the inch. While they will cut to a certain extent, the output is mixed with a large quantity of fine particles or "mush." With twenty teeth to the inch in a single row there is over one-half inch of solid metal which is forced through the material operated upon, compressing the same over one-half, causing the teeth to become clogged and preventing further cutting until the substance is forced through or cleared out. While with the double row of teeth there is about one-half the amount of metal being forced through the material at one time, the compression is reduced about one-half, the teeth have a greater opportunity to free themselves, and the result is cleaner-cut long threads with a greatly-reduced amount of particles or mush.

Coacting with each series of teeth is a planing-blade 6, which extends through a throat 7, formed in the disk 1 at the side of the teeth opposite that of their direction of movement.

In operation the cocoanut or other material is to be fed to the upper side of the disk. While the same is rotated, the teeth will cut the material into fine long threads, which will be shaved off of the body portion by means of the blades 6, and the material so separated will pass down through the throat 7 to a suitable receptacle.

Having thus described my invention, I claim as new and desire to secure by Letters Patent—

1. A stripping-machine attachment, comprising rows of teeth arranged in pairs, the teeth of one row being staggered with relation to the teeth of the other row, a holding device consisting of a section having recesses to receive the teeth of one row and a section having recesses to receive the teeth of the other row, the recesses being in adjacent faces of the sections, and means for securing the sections together, substantially as specified.

2. A stripping-machine attachment, comprising a disk adapted to rotate, rows of teeth arranged in pairs, the teeth of one row being staggered with relation to the teeth of the other row, and a holder for two rows of teeth, consisting of two sections provided with staggered recesses in their adjacent faces, the said holder being seated in the disk.

In testimony whereof I have signed my name to this specification in the presence of two subscribing witnesses.

WILLIAM F. McALLISTER.

Witnesses:
   WM. WAGNER, Jr.,
   K. H. ROSS.